United States Patent

[11] 3,624,810

[72] Inventor David P. Hass
        Detroit, Mich.
[21] Appl. No. 801,986
[22] Filed Feb. 25, 1969
[45] Patented Nov. 30, 1971
[73] Assignee Eaton Yale & Towne Inc.
        Cleveland, Ohio

[54] VEHICLE SAFETY APPARATUS
     25 Claims, 4 Drawing Figs.
[52] U.S. Cl. .......................................... 280/150 AB,
                                                    280/87 R
[51] Int. Cl. .......................................... B60r 21/10
[50] Field of Search ............................ 280/150;
                                      60/26.1; 296/84, 65; 244/1

[56]            References Cited
          UNITED STATES PATENTS
2,477,933  8/1949  Labser ........................ 296/84

| 2,850,291 | 9/1958 | Ziccardi | 280/150 |
| 2,931,665 | 4/1960 | Sandor | 280/150 |
| 3,197,234 | 7/1965 | Bertrand | 280/150 |
| 3,242,666 | 3/1966 | Peterson | 60/26.1 |
| 3,425,712 | 2/1969 | Berryman | 280/150 |
| 3,464,284 | 9/1969 | Fergle | 60/26.1 |
| 2,806,737 | 9/1957 | Maxwell | 280/150 X |

FOREIGN PATENTS 870,071  3/1953  Germany ..................... 296/84

*Primary Examiner*—Kenneth H. Betts
*Attorney*—Yount, Flynn & Tarolli

ABSTRACT: An improved safety device for protecting an occupant of a vehicle during an accident includes a confinement which is operable from a collapsed condition to an expanded condition in which it restrains movement of the occupants. The confinement is expanded by detonation of an explosive charge which propels a member outwardly to effect the expansion.

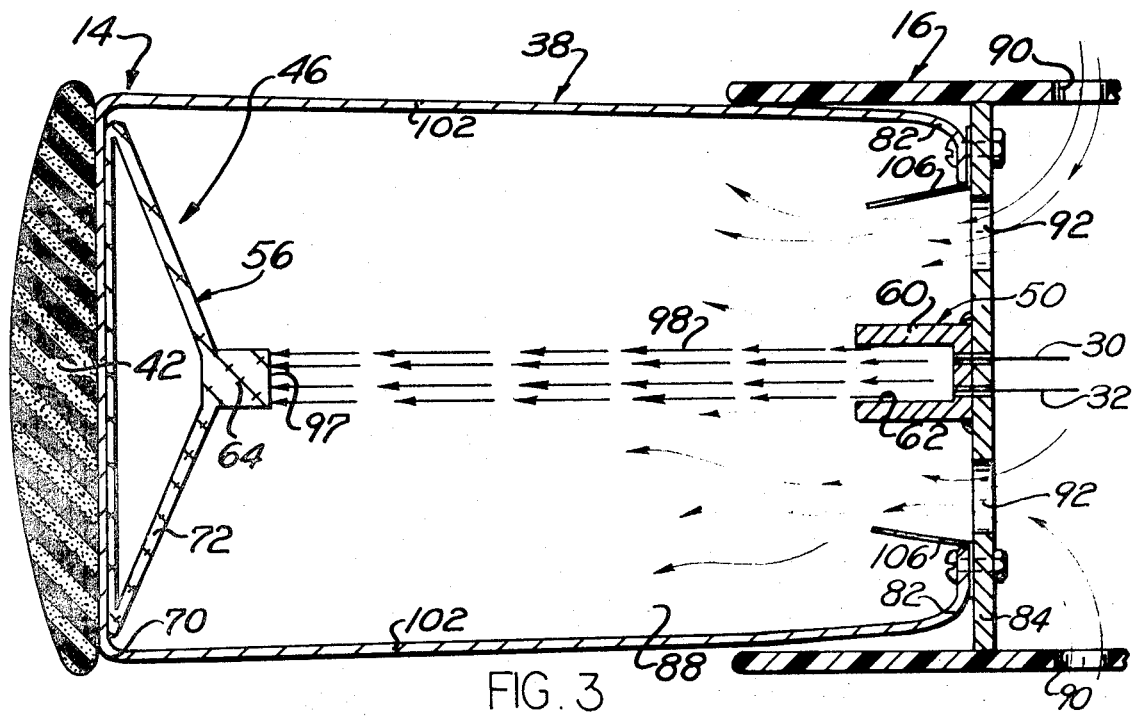
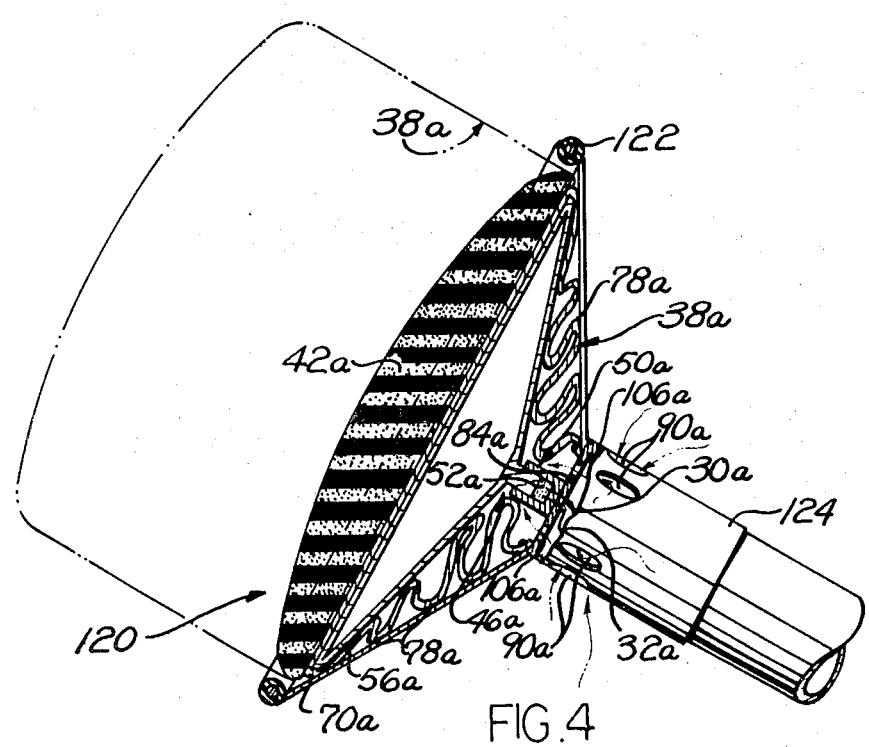

VEHICLE SAFETY APPARATUS

This invention relates generally to a safety device for protecting an occupant of a vehicle during an accident and more particularly to a safety device which operates to restrain movement of the occupant of the vehicle during an accident.

A known safety device for protecting an occupant of a vehicle during an accident includes a fluid supply or reservoir which is activated to expand an expansible confinement upon the occurrence of an accident. Heretofore, problems have been encountered in using this known safety device due to the relatively large size and weight of a fluid reservoir which contains a sufficient volume of fluid to expand the confinement. These problems of size and weight become particularly acute when the safety device is adapted to protect the driver of the vehicle by mounting the fluid reservoir and confinement on the steering wheel and dashboard of the vehicle.

Accordingly, it is an object of this invention to provide a relatively compact and lightweight safety device for protecting an occupant of a vehicle during an accident.

Another object of this invention is to provide a new and improved safety device for protecting an occupant of a vehicle during an accident wherein the safety device includes a confinement adapted to be operated from a collapsed condition to an expanded condition by detonation of an explosive charge which propels means which when moved by the explosive effects expansion of the confinement.

Another object of this invention is to provide a new and improved safety device for protecting an occupant of a vehicle wherein the safety device includes a confinement which is adapted to be operated from a collapsed condition to an expanded condition while maintaining substantially constant the fluid pressure in a compartment in which the confinement is located.

Another object of this invention is to provide a new and improved safety device for protecting an occupant of a vehicle during an accident wherein the safety device includes a confinement adapted to be expanded to restrain movement of an occupant of the vehicle during an accident, an explosive charge for effecting the expansion of the confinement, and means for enabling air to flow from the passenger compartment of the vehicle into the confinement as the confinement is being expanded to thereby maintain the fluid pressure in the passenger compartment substantially constant.

Another object of this invention is to provide a new and improved safety device in accordance with the preceding paragraphs and wherein the confinement is made of a deformable, self-supporting material for absorbing a substantial portion of the energy of an impact of the occupant with the expanded confinement.

These and other objects and features of the invention will become more apparent upon a consideration of the following description taken in connection with the accompanying drawing wherein:

FIG. 3 is a schematic sectional view on an enlarged scale, illustrating the confinement in an expanded condition; and FIG. 4 is a schematic illustration of a safety device, constructed in accordance with the present invention, mounted on the steering wheel of a vehicle.

This invention provides a compact and lightweight safety device which is adapted to be mounted in a passenger compartment of a vehicle to protect occupants of the vehicle during an accident. The safety device includes a confinement which is ballistically expanded by an outward shooting of a portion of the confinement under the influence of an explosive charge. In order to minimize noise and pressure changes in the passenger compartment as a result of detonating the explosive charge and expanding the confinement, air from the passenger compartment is drawn into the confinement as it is expanded.

Figure 1:
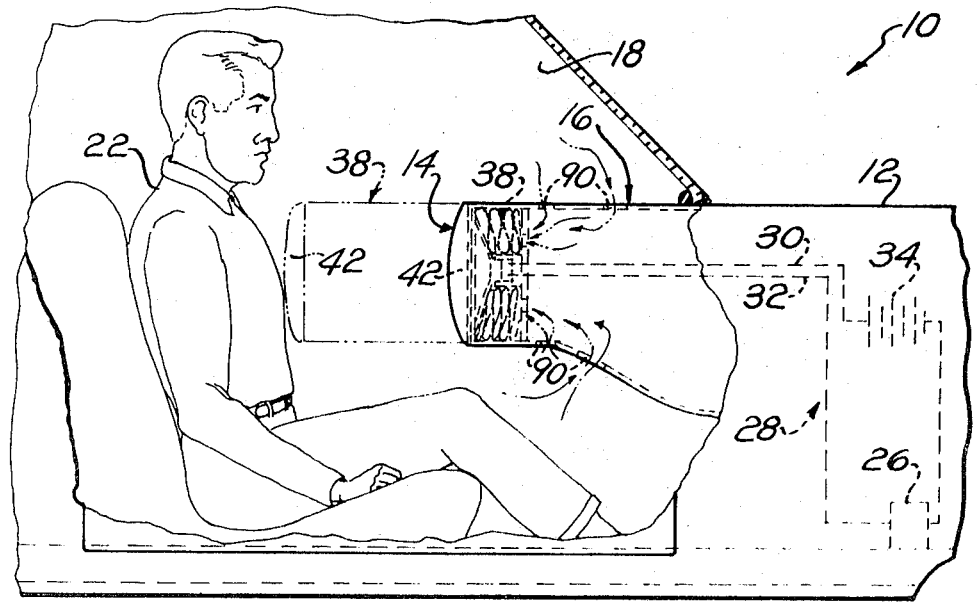
FIG. 1 is a schematic illustration of a vehicle wherein a safety device constructed in accordance with the present invention is mounted.

Although safety apparatus constructed in accordance with the present invention can be used in many different kinds of vehicles, such as airplanes, automobiles, tractors, trucks and boats, a safety apparatus 10 constructed in accordance with the present invention is illustrated schematically in FIG. 1 in association with an automotive vehicle 12. The safety apparatus 10 includes a safety device 14 which can be mounted at many different locations within the vehicle, such as in the back of a seat 15 or on a steering wheel (FIG. 4). In the illustrated embodiment of the invention, the safety device 14 is mounted on the dashboard 16 in a passenger compartment 18 of the vehicle 12 to protect an occupant 22 of the vehicle during an accident. A sensor assembly 26 is provided for detecting the occurrence of an accident and activating the safety device 14. Accordingly, the sensor assembly 26 is operatively connected with the safety device 14 by electrical circuitry 28 including leads or wires 30 and 32 and a battery 34.

The safety device 14 protects the occupant 22 during an accident by restraining forward movement of the occupant. To this end, the safety device 14 includes an expansible confinement 38 which is expanded from a collapsed condition, illustrated in FIGS. 1 and 2, to an expanded condition, illustrated in dashed lines in FIGS. 1 and 2 and solid lines in FIG. 3. A suitable pad or panel 42 is positioned on the confinement 38 for engagement by the torso of the occupant 22 when the confinement is expanded. In one embodiment of the invention, the pad or panel 42 advantageously forms an outer surface of the dashboard 16 when the confinement 38 is in the collapsed condition of FIGS. 1 and 2. It is contemplated that, in certain environments, the pad or panel 42 could be eliminated.

It is also contemplated that the safety device 14 could be mounted on the seat 15 in such a manner as to form a headrest for the occupant 22 of the vehicle 12 when the confinement is in the expanded condition.

Figure 2:
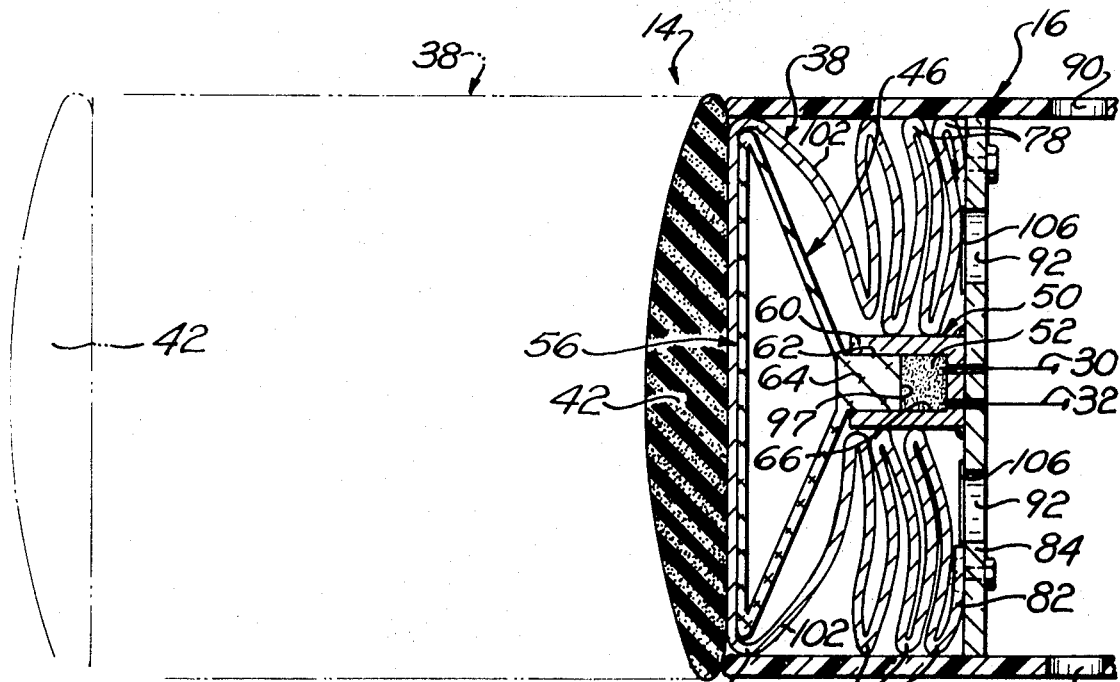
FIG. 2 is a schematic sectional view, taken on an enlarged scale, illustrating a confinement, which is part of the safety device of FIG. 1, in a collapsed condition.

A compact and lightweight actuator assembly 46 is provided for ballistically expanding the confinement 38 form the collapsed condition of FIG. 2 to the expanded condition of FIG. 3 in response to operation of the sensor assembly 26 upon the occurrence of an accident. To effect the ballistic expansion of the confinement 38, the actuator assembly 46 includes an explosive means or cartridge 50 containing an explosive charge 52. Upon detonation of the explosive charge 52 by electrical energy conducted over the leads 30 and 32, a lightweight drive assembly 56 is propelled or shot outwardly from the normal position of FIG. 2 to the operated position of FIG. 3 under the influence of the explosive charge. To this end, the cartridge 50 includes a cylindrical casing 60 having a bore 62 in which a piston or body 64 of the drive assembly 56 is slidably mounted. The casing 60 and piston 64 cooperate to define a firing chamber 66 in which the explosive 52 is located. An outer end portion 70 of the confinement 38 is connected to a drive frame 72 on which the pad 42 is mounted. The drive frame 72 is in turn connected to the piston 64.

Upon detonation of the explosive charge 52, the piston 64 is shot or propelled out of the bore 62 from the normal position of FIG. 2 to the operated position of FIG. 3 to thereby expand the confinement 38. This expansion of the confinement 38 is facilitated by the provision of a plurality of accordianlike pleats or bellows 78 in the confinement when it is in the collapsed condition of FIG. 2. The previously described outward movement of the drive assembly 56 expands the confinement 38 by straightening or eliminating the pleats 78 as the drive assembly is moved outwardly. The outward movement of the drive assembly 56 is limited by connecting an inner end portion 82 of the confinement 38 to an end or base wall 84 which is fixedly secured to the dashboard 16 (see FIG. 3). The force with which the drive assembly 56 is propelled outwardly from the normal position of FIG. 2 to the operated position of FIG. 3 can be increased by increasing the size of the explosive charge 52 and by increasing the length of the bore 62.

In order to minimize pressure changes and noise caused by expanding the confinement 38 from the collapsed condition of FIG. 2 to the expanded condition of FIG. 3, air is drawn from the passenger compartment 18 into a chamber 88 (FIG. 3) defined by the confinement 38. This flow of air minimizes the noise resulting from expanding the confinement 38 by effectively short circuiting or minimizing the pressure wave caused by the outward movement of the confinement under the influence of the explosive charge 52. This pressure wave is short circuited or minimized by drawing air into the confinement 38 (see FIG. 3) through suitable openings or apertures 90 in the dashboard 16 and openings or apertures 92 in the end wall 84. This flow of air into the interior of the confinement 38 from the passenger compartment 18 results in the pressure in the passenger compartment being maintained substantially constant as the confinement is expanded.

In order to enable air to be drawn from the passenger compartment into the confinement 38 as the confinement is expanded from the collapsed position of FIG. 2 to the expanded condition of FIG. 3, detonation of the explosive charge 52 must generate a relatively small volume of gas which is effective to quickly and positively propel the drive assembly 56 to the operated position of FIG. 3. To this end, the explosive charge 52 is contained within the relatively small firing chamber 66 (see FIG. 2) defined by the casing 60 and piston 64. Detonation of the explosive charge 52 increases the pressure within the confines of the firing chamber 66 to shoot or hurl the piston 64 out of the bore 62 to thereby expand the confinement 38. Due to the relatively small size of the firing chamber 66, detonation of the small explosive charge 52 generates a relatively small volume of gas. This small volume of gas is directed against an end surface 97 of the piston 64 by the bore 62, as is indicated schematically by the arrows 98 in FIG. 3. Although many different types of explosives can be used to make up the charge 52, a flow of air into the confinement 38 as it is expanded is promoted by the use of an explosive charge which, upon detonation, generates a volume of gas which is substantially less than the volume of the chamber 88 of the expanded confinement 38. Therefore, a volume of air which is equal to a major portion of the volume of the confinement is drawn into the confinement from the passenger compartment 18 upon expansion of the confinement.

The confinement 38 may be made of a variety of materials. In the illustrated embodiment of the invention, the confinement 38 is made of a material which has sufficient structural strength to hold or maintain the confinement in the expanded condition of FIG. 3. In addition, the material making up the confinement 38 has sufficient resistance to deformation to restrain the occupant 22 against movement during the accident by absorbing impact forces exerted by the occupant 22 against the pad 42 and confinement 38. Therefore, in the illustrated embodiment of the invention, the walls 102 of the confinement 38 are made of a deformable, nonelastic form retaining material, such as sheet having a thickness of approximately 15 mil. Upon impact of the occupant 22 against the outer panel or pad 42, the walls 102 of the confinement are deformed by the impact to thereby absorb the kinetic energy of the occupant. The structure of the confinement 38 is similar to that set forth in application Ser. No. 662,679, filed Aug. 23, 1967 (now U.S. Pat. No. 3,425,712) by Charles O. Berryman and entitled "Safety Device." However, the confinement could, if desired, be made of a flexible nonform retaining material.

The walls 102 of the confinement 38 are deformed upon engagement of the occupant 22 with the forward pad or panel 42 to thereby absorb the kinetic energy of the occupant and restrain his movement. Accordingly, the confinement 38 is capable of being successively deformed to a greater and greater extent by a series of forward impulses or movements of the occupant 22 during an accident. Rebounding of the occupant from the forward panel between these impulses is minimized since the walls 102 of the confinement are in the illustrated embodiment, formed of an inelastic material which absorbs the kinetic energy of the occupant. Therefore, the confinement 38 need not be fluid or air tight since the confinement does not rely on pressure within the chamber 88 to restrain the forward movement of the occupant 22. However, check valves 106 may be provided for preventing an outward flow of air from the confinement and for preventing dirt and other foreign articles from getting into the confinement while it is in the collapsed condition of FIG. 2. It is believed that the use of check valves or other flow retarding means will be particularly advantageous if the confinement 38 is made of a material which is readily collapsed.

The embodiment of the invention illustrated in FIG. 4 includes a safety device 120 which is adapted to protect a driver of a vehicle during an accident. To this end, the safety device 120 is mounted on a steering wheel 122 of the vehicle for rotation relative to a steering column or steering wheel support assembly 124 of the vehicle. Since the safety device 120 is constructed and operates in a manner generally similar to that of the safety device 14 of FIGS. 1–3, numerals similar to those used to designate parts of the safety device 14 are used to designate corresponding parts of the safety device 120, the suffix letter a being used in connection with the numerals for designating the parts of the safety device 120 to avoid confusion.

The safety device 120 is particularly well adapted for mounting on the steering wheel 122 since the safety device is relatively compact and lightweight, and offers very little inertia opposing rotation of the steering wheel 122. The absence of inertia also minimizes the force required to move the steering wheel 122 axially of the steering column 124 to collapse the steering column, in a known manner, upon the occurrence of an accident. In addition, the safety device 120 has a generally symmetrical configuration so that the center of gravity of the safety device will be located along the axis of rotation of the steering wheel 122 to thereby minimize shaking or vibration of the steering wheel when it is rotated by a driver of a vehicle to effect a turning of a vehicle.

The lightweight and compact structure of the safety device 120 results from the use of an operator or actuator assembly 46a to expand a confinement 38a. The actuator assembly 46a includes an explosive cartridge assembly 50a having an explosive charge 52a. Upon the occurrence of an accident, the explosive charge 52a is detonated by energizing leads 30a and 32a, to shoot or propel the drive assembly 56a in the manner previously explained in connection with the embodiment of the invention illustrated in FIGS. 1–3. The drive assembly 56a is secured to a forward portion 70a of the confinement so that the outward movement of the drive assembly straightens or eliminates pleats or accordionlike bellows 78a of the confinement to thereby expand the confinement. The confinement 38a may be made of a flexible material or a nonelastic deformable material, such as sheet steel, as discussed above in connection with the embodiment of FIG. 1.

To minimize noise caused by expanding the confinement 38a, air is drawn into the confinement from the passenger compartment as the confinement is expanded. To this end, apertures 90a are provided in the steering column 124 and apertures 106a are provided in a base or end wall 84a. To promote this inward flow of air, detonation of the explosive charge 52a results in the generation of an amount of gas which is a minor portion of the volume of the expanded confinement 38a.

In view of the foregoing description, it can be seen that the safety devices 14 and 120 are both relatively compact and lightweight due to the use of relatively small explosive charges (52 or 52a) for shooting or propelling drive assemblies 56 or 56a outwardly to expand the confinement 38 or 38a. The noise generated by the expansion of the confinements is minimized by drawing air from the passenger compartment into the confinement as the confinements are being expanded. This flow of air into the confinements is promoted by the use of explosive charges which, upon detonation, generate relatively small volumes of gas. The confinements 38 and 38a may be made self-supporting when in the expanded condition by the use of a deformable nonelastic material for the walls of the confinements.

Having described my invention, I claim:

1. A safety device for protecting an occupant of a vehicle during an accident, said safety device comprising expansible means expandable from a collapsed condition to an expanded condition in which said expansible means is adapted to restrain movement of the occupant during an accident and means for expanding said expansible means from said collapsed condition to said expanded condition, said means including an explosive and a casing defining a bore in which said explosive charge is located and means propelled by detonation of said explosive charge including a member which is slidably received in said bore, said member being adapted to be propelled out of said bore by pressure generated upon detonation of said explosive charge for expanding said expansible means.

2. A safety device for protecting an occupant of a vehicle during an accident, said safety device comprising expansible means expandable from a collapsed condition to an expanded condition in which said expansible means is adapted to restrain movement of the occupant during an accident, and means for expanding said expansible means from said collapsed condition to said expanded condition, said means including an explosive charge, means propelled by detonation of said explosive charge for expanding said expansible means, and means for enabling air to flow into said expansible means from a compartment of the vehicle in which the occupant is located during expansion of said expansible means.

3. A safety device as set forth in claim 2 wherein said expansible means is made of a self-supporting material for absorbing a substantial part of the energy of impact of the occupant thereagainst due to deformation thereof.

4. A safety device for protecting an occupant of a vehicle during an accident, said safety device comprising expansible means expandable from a collapsed condition to an expanded condition in which said expansible means is adapted to restrain movement of the occupant during an accident, and means for expanding said expansible means from said collapsed condition to said expanded condition, said means including an explosive charge, means propelled by detonation of said explosive charge for expanding said expansible means, and means for enabling air to flow into said expansible means during expansion of said expansible means.

5. A safety device as set forth in claim 4 wherein detonation of said explosive means results in the generation of a volume of gas which effects the propulsion of said means propelled thereby.

6. A safety device as set forth in claim 4 further including check valve means for blocking a flow of air from said expansible means.

7. A safety device for protecting an occupant of a vehicle, said safety device comprising a confinement expandable from a collapsed condition to an expanded condition in which said confinement is adapted to restrain movement of the occupant of the vehicle during an accident, and means for ballistically operating said confinement from said collapsed condition to said expanded condition and for contemporaneously therewith enabling a relatively large volume of air to be drawn into said confinement.

8. A safety device as set forth in claim 7 wherein said means ballistically operating said confinement includes an explosive charge and means operatively connected to one portion of said confinement and adapted to be propelled by detonation of said explosive charge to move said one portion of said confinement relative to another portion of said confinement to thereby expand said confinement.

9. A safety device as set forth in claim 7 wherein said means for ballistically operating said confinement includes an explosive charge, a casing for holding said explosive charge, and means operable in response to detonation of said explosive charge to expand said confinement including piston means for cooperating with said casing to define a chamber in which said explosive charge is located, said piston means being operatively connected to one portion of said confinement and adapted to move said one portion of said confinement relative to another portion of said confinement under the influence pressure created by detonation of said explosive charge.

10. A safety device as set forth in claim 7 wherein said confinement is made at least in part of a nonelastic, form retaining material.

11. A safety device as set forth in claim 7 wherein said means for ballistically operating said confinement includes an explosive charge and means for expanding said confinement under the influence of pressure created by detonation of said explosive charge, said explosive charge being capable of generating a volume of gas which is substantially less than the relatively large volume of air drawn into said confinement upon detonation of said explosive charge to thereby enable air to be drawn into the confinement as it is expanded.

12. A safety device for protecting an occupant of a vehicle during an accident, said safety device comprising a confinement expandable from a collapsed condition to an expanded condition in which said confinement is adapted to restrain movement of the occupant of the vehicle during an accident, first and second cooperating parts at least partially defining a chamber, said first part being connected to said confinement, an explosive charge located within said chamber, and means for detonating said explosive charge to move said first part relative to said second part to thereby effect expansion of said confinement from said collapsed condition to said expanded condition.

13. A safety device as set forth in claim 12 wherein said first part includes piston means slidably mounted in a bore defined by said second part, said piston means being propelled out of said bore by pressure generated upon detonation of said explosive charge to thereby effect the expansion of said confinement.

14. A safety device as set forth in claim 12 wherein detonation of said explosive charge generates a volume of gas which is a minor portion of the volume of said confinement in said expanded condition, said safety device further including means for enabling a volume of air which is a major portion of the volume of said confinement to flow into said confinement from a compartment of the vehicle in which the occupant is located contemporaneously with expansion of said confinement to said expanded condition to thereby maintain substantially constant the fluid pressure in the compartment of the vehicle.

15. A safety device as set forth in claim 14 wherein said confinement is made of a self-supporting means having sufficient structural strength to hold said confinement in the expanded condition.

16. A safety device as set forth in claim 15 wherein said confinement and explosive charge are mounted on the steering wheel of the vehicle for rotation therewith relative to a steering wheel support assembly.

17. A safety device for protecting an occupant of a vehicle during an accident, said safety device comprising expansible means expandable from a collapsed condition to an expanded condition in which said expansible means is adapted to restrain movement of the occupant during an accident, and means for expanding said expansible means from said collapsed condition to said expanded condition, said means including an explosive charge, means propelled by detonation of said explosive charge for expanding said expansible means, and wherein said expansible means and said explosive means are mounted on the steering wheel of the vehicle for rotation therewith relative to a steering wheel support assembly.

18. A safety device adapted to restrain movement of an occupant of a vehicle during a collision, said safety device comprising;
an expansible member, movable from an unactuated position adjacent a portion of the vehicle to an actuated position adjacent an occupant position,
means for applying a momentary impulse force to said member for accelerating said member from the unactuated position toward the actuated position, and means for allowing said member to continue moving solely by its own inertia to the actuated expanded position.

19. A safety device as set forth in claim 18 further including means resisting movement of said member from the actuated toward the unactuated position, whereby said member will apply a restraining force against movement of said occupant.

20. A safety device as set forth in claim 18 wherein said means for applying an impulse comprises an explosive charge positioned adjacent said member and means for detonating said explosive charge in response to the vehicle encountering a collision condition.

21. A safety device for restraining movement of an occupant of a vehicle during a collision, said safety device comprising;

a confinement having a collapsed condition whereat said confinement is adjacent a part of the vehicle and an expanded condition whereat said confinement extends to adjacent an occupant position, and means for applying a momentary impulse force to a portion of said confinement for accelerating said portion from the position adjacent the part of the vehicle toward the occupant position, and means for allowing said portion to continue moving solely by its own inertia toward the occupant position, thereby expanding said confinement to said expanded condition.

22. A safety device as set forth in claim 21 further including means for resisting movement of said portion from the expanded condition toward the collapsed condition, whereby said portion will apply a restraining force against movement of said occupant.

23. A safety device as set forth in claim 21 wherein said means for applying an impulse force comprises an explosive charge positioned adjacent said portion and means for denoting said explosive charge in response to the vehicle encountering a collision condition.

24. A safety device for protecting an occupant of a vehicle during an accident, said safety device comprising expansible means expandable from a collapsed condition to an expanded condition in which said expansible means is adapted to restrain movement of the occupant during an accident, said expansible means including means for allowing air to be drawn into said expansible means from the atmosphere during expansion thereof, and means for expanding said expansible means from said collapsed condition to said expanded condition, said means including an explosive charge and means propelled by detonation of said explosive charge for expanding said expansible means by moving a portion thereof toward the expanded position.

25. A safety device for restraining movement of an occupant of a vehicle during a collision, said safety device comprising;

a confinement having a collapsed condition whereat said confinement is adjacent a part of the vehicle and an expanded condition whereat said confinement extends to adjacent an occupant position, and means for applying an impulse to a portion of said confinement for accelerating said portion from the position adjacent the part of the vehicle toward the occupant position, and means for allowing said portion to continue moving by inertia toward the occupant position, thereby expanding said confinement to said expanded condition, said last stated means comprising valve means mounted as to control a fluid flow path between the atmosphere outside said confinement and the atmosphere within said confinement and openable in response to a differential in fluid pressure between said atmospheres to allow fluid to be drawn from the atmosphere outside said confinement into said confinement as said portion moves toward the expanded position.

* * * * *